United States Patent
Narayanan et al.

(10) Patent No.: US 7,004,991 B2
(45) Date of Patent: Feb. 28, 2006

(54) AQUEOUS DELIVERY SYSTEMS FOR WATER SOLUBLE AGRICULTURAL ACTIVES USING POLYMERIC DISPERSANTS

(75) Inventors: Kolazi S. Narayanan, Wayne, NJ (US); Domingo I. Jon, New York, NY (US)

(73) Assignee: ISP Investments Inc., Wilmington, DE (US)

( * ) Notice: Subject to any disclaimer, the term of this patent is extended or adjusted under 35 U.S.C. 154(b) by 245 days.

(21) Appl. No.: 10/314,596

(22) Filed: Dec. 9, 2002

(65) Prior Publication Data

US 2004/0107753 A1 Jun. 10, 2004

(51) Int. Cl.
*C05F 11/00* (2006.01)
(52) U.S. Cl. ......................................... 71/27
(58) Field of Classification Search .............. 71/27, 71/63
See application file for complete search history.

(56) References Cited

U.S. PATENT DOCUMENTS

| | | | | |
|---|---|---|---|---|
| 4,605,550 A | * | 8/1986 | Trill | 424/487 |
| 5,182,138 A | * | 1/1993 | Matsuzawa et al. | 427/157 |
| 5,369,145 A | * | 11/1994 | Gasman et al. | 523/120 |
| 5,443,764 A | * | 8/1995 | Lloyd et al. | 264/15 |
| 5,628,813 A | * | 5/1997 | Chen et al. | 71/64.02 |
| 5,830,933 A | * | 11/1998 | Synodis et al. | 524/37 |
| 6,096,345 A | * | 8/2000 | Narayanan et al. | 424/501 |
| 6,124,374 A | * | 9/2000 | Kolias et al. | 523/120 |
| 6,156,803 A | * | 12/2000 | Curry et al. | 514/772.2 |
| 6,624,242 B1 | * | 9/2003 | Curry et al. | 524/808 |

FOREIGN PATENT DOCUMENTS

| | | | |
|---|---|---|---|
| CA | 2256845 | * | 6/2000 |
| GB | 1392923 | * | 5/1975 |

OTHER PUBLICATIONS

Hawley's Condensed Chemical Dictionary, published by Van Nostrand Reinhold company, 1987, pp. 699-700.*

* cited by examiner

*Primary Examiner*—C. Sayala
(74) *Attorney, Agent, or Firm*—William J. Davis; Walter Katz

(57) ABSTRACT

What is described herein is an aqueous dispersion for coating water-soluble granules of a water soluble active agricultural chemical to substantially increase the rain fastness of the active. The dispersion includes by wt.

Figure 1:
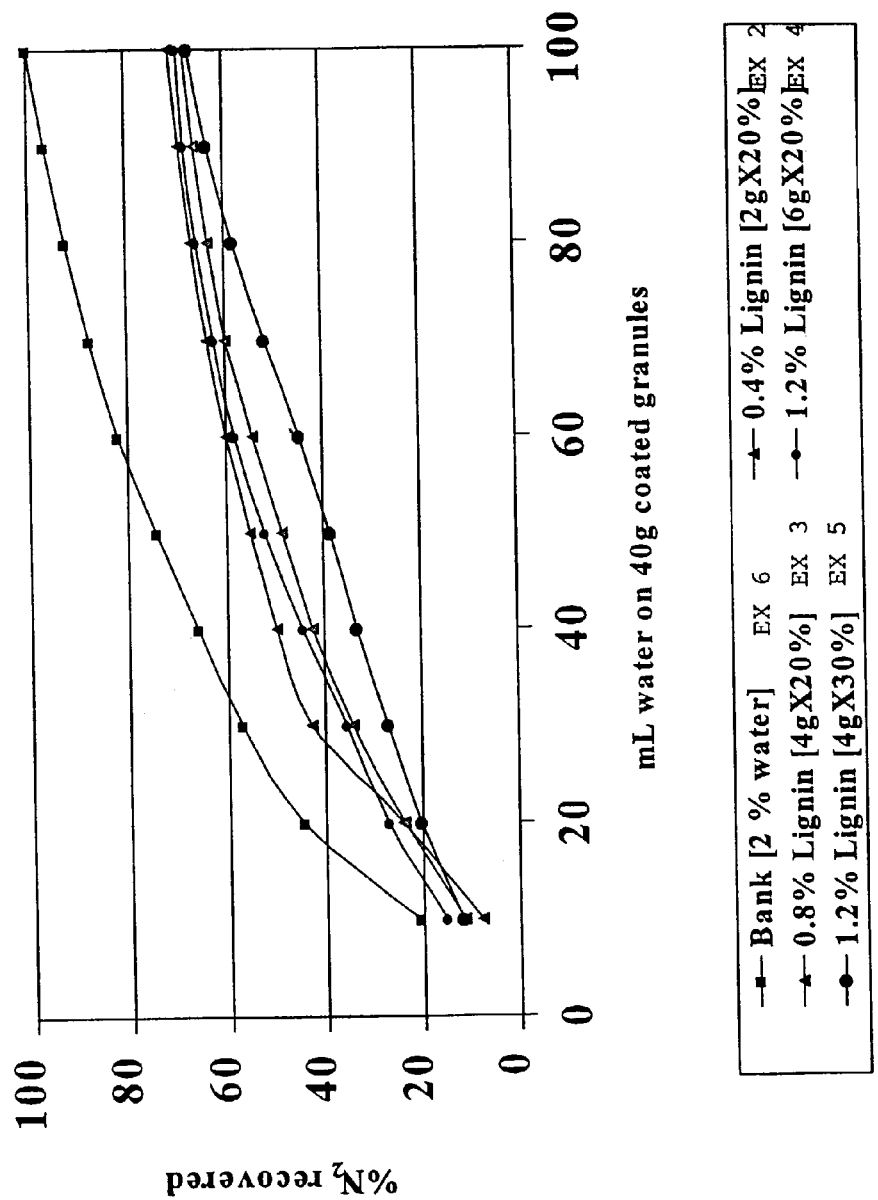
Figure 2:
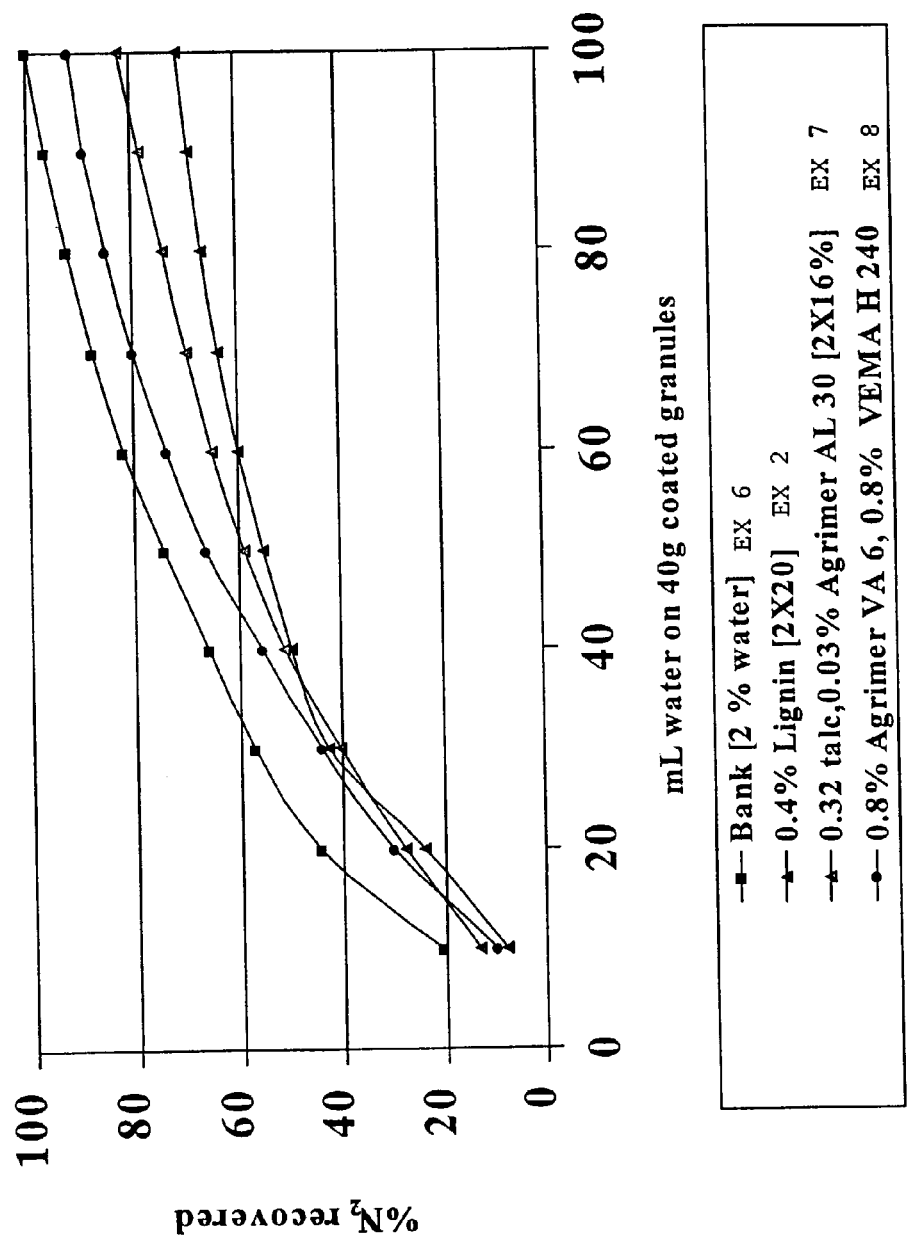

(a) at least 0.1% of a polymeric anionic dispersing agent,
(b) 5–30% of a water-insoluble, natural or synthetic inorganic or organic polymer, and
(c) to 100% of water.

7 Claims, 2 Drawing Sheets

AQUEOUS DELIVERY SYSTEMS FOR WATER SOLUBLE AGRICULTURAL ACTIVES USING POLYMERIC DISPERSANTS

BACKGROUND OF THE INVENTION

1. Field of the Invention

This invention relates to delivery systems to increase rain fastness of water soluble active agricultural chemicals, and, more particularly, to an aqueous dispersion of such actives for coating granules thereof to substantially increase its rain fastness.

2. Description of the Prior Art

Plants in geographical areas which experience heavy rains are susceptible to wash-off of applied water soluble active agricultural chemical, such as, urea. Accordingly, it is desired to provide more effective rain fastness for such chemicals by providing a new and improved agricultural formulations containing polymeric dispersants therein.

IN THE DRAWINGS

FIG. 1 presents the results of nitrogen release for the coated granules of Examples 2–5 and 6 [Blank].

FIG. 2 presents the results of nitrogen release for the coated granules of Examples 7, 8, and 6 [Blank].

SUMMARY OF THE INVENTION

What is described herein is an aqueous dispersion for coating water-soluble granules of a water soluble active agricultural chemical to substantially increase the rain fastness of the active. The dispersion includes by wt.

(a) at least 0.1% of a polymeric anionic dispersing agent, (b) 5–30% of a water-insoluble, natural or synthetic inorganic or organic polymer, and (c) to 100% of water.

In the preferred forms of the invention the dispersion includes (a) an olefin-maleic acid/ester condensate, partially neutralized, or copolymers thereof, lignin sulfonate, naphthalene sulfonate, naphthalene sulfonate/formaldehyde condensate, or a polyacrylate; and (b) is talc, starch, cellulose, lignin or gypsum.

Suitably the aqueous dispersion may be dried if desired to provide the composition in powder form.

Typically a granule of a water soluble active agricultural chemical, e.g. urea, is coated with the dispersion so that 0.1–5 parts of component (b) is present on 100 parts of the granule.

The granules of the invention experience at least a 20% reduction in wash off of the active after a one inch rain fall as compared to an uncoated granule.

DETAILED DESCRIPTION OF THE INVENTION

Polymeric dispersants are used as coformulants as dispersants of choice for formulating suspension concentrates, suspoemulsions, and, solid delivery systems like wettable powders, water dispersible granules and tablets. Such polymeric dispersants include, dISPerse, a new line of polymeric dispersants. dISPerse is an aqueous solution of partially neutralized methyl vinyl ether maleic acid half esters (ethyl/butyl) copolymers. They have shown high degree of suspensibility in suspension concentrates for a host of active ingredients like herbicides, insecticides, fungicides, and other growth regulators, organic dyes, inorganic pigments, including certain water-insoluble polymers. In addition dISPerse line of polymers are film formers providing reduced volatility and improved rainfastness especially when used with pyrrolidone copolymers.

Lignosulfonates are derived from naturally occurring products and have a wide variety of molecular weights, and sulfonation and salt content. They provide dispersional stability both in liquid and solid formulations. Their fast rates of dissolution promote dispersibility, but contribute little to rainfastness, an important requirement for topically applied active ingredients such as foliar fungicides and insecticides.

A combination of good film forming polymers like pyrrolidone copolymers, disperse and select members of lignin sulfonates can provide excellent dispersibility, disintegration and binding including rainfastness. Use of specific lignosulfonates with high degree of sulfonation has shown improved dissolution rates for water-soluble pyrrolidone copolymers like polyvinylpyrrolidone vinyl acetate copolymers. Kraft lignosulfonates with high molecular weights in the order of 10,000 were found to be excellent dispersing agents in producing stable dispersions of water insoluble pyrrolidone copolymers. These dispersions were used to impart rainfastness in typical suspension concentrates.

The use of both classes of polymeric dispersants [lignosulfonates, dISPerse and/or pyrrolidone copolymers] as coformulants in combination with one another in the same formulation has been found to result in high levels of dispersional stability as shown by suspensibility measurements, improved rates of disintegration and improved rainfastness relative to formulations employing only a single type of dispersant. The coformulant matrix can also be used as tank mix additives.

In accordance with the invention, typical active agricultural chemicals are water-soluble active, such as commercial fertilizers, urea or NKP fertilizers, herbicides, e.g. Roundup®, soil nutrients, and the like.

In summary, the aqueous dispersion for coating water-soluble granules of such water soluble active agricultural chemicals to substantially increase the rain fastness, of said active, includes, by wt.

(a) at least 0.1% of a polymeric anionic dispersing agent, (b) 5–30% of a water-insoluble, natural or synthetic inorganic or organic polymer, and (c) to 100% of water.

Suitably (a) is an olefin-maleic acid/estercondensate partially neutralized, or copolymers thereof, lignin sulfonate, naphthalene sulfonate, naphthalene sulfonate/formaldehyde condensate, or polyacrylate; (b) is talc, starch, cellulose, lignin or gypsum, and the dispersion is an aqueous dispersion or a dried powder.

The invention also includes a granule of a water soluble active agricultural chemical is coated with the dispersion wherein 0.1–5 parts of (b) is present on 100 parts of the granule.

In preferred embodiments of the invention, a fine aqueous dispersion of Agrimer® AL 30 (ISP) as a polymer in water containing methyl vinyl ether/maleic acid ethyl half-ester partially neutralized as the sodium salt (dISPerse®) (ISP) is sprayed-onto granules containing urea and fillers; at a rate of 2 lbs. of dispersion per 100 lbs. of granules. The thus-coated granules has a 20% reduction in wash-off in one inch of rain as compared to the uncoated granules.

Other polymers useful herein include Agrimer® VA 6, Agrimere® VEMA H 240, and Agrimer® VA 5.

EXAMPLE 1

Preparation of Lignin Suspension

Dissolved 8.16 g 25% EZ-Sperse dispersant (a commercial anionic polymeric dispersant aqueous solution of methyl vinyl ether maleic acid butyl/ethyl half ester partially neutralized with sodium hydroxide), 0.21 g Rhodorsil and 3.57 g propylene glycol in 55 g water in a Waring blender. Added 17.75 g Kraft Lignin (Westvaco). The lignin was agitated until a uniform suspension was obtained. The suspension was then wet-milled using an Eiger Machinery Model #100 with a 70% to 80% loading of 0.1 cm zirconium oxide beads. The suspension was milled for 10 minutes at 3000 rpm. The temperature of the cooling bath was −5° C. to 0° C., which gave a milling temperature between 15° C. and 21® C. for the charge. The operating conditions of the wet-mill resulted in about 15 passes of the suspension per minute.

A pre-dissolved solution of 14.9 g water, 0.16 g Kelzan S and 0.24 g proxel GXI was added to the milled suspension. The resultant mixture was stirred to provide uniform suspension.

Composition of Example 1

| | | |
|---|---|---|
| Lignin | 17.75 | |
| EZ-Sperse | 2.04 | (8.16 as 25% aqueous solution) |
| Rhodorsil 426R | 0.21 | |
| Propylene Glycol | 3.57 | |
| Kelzan S | 0.16 | |
| Proxel GXL | 0.24 | |
| Water | 76.02 | (water added 69.90) |
| Total | 100.00 | |

EXAMPLE 2 [0.4% Lignin]

Procedure for Coating the Granules

A weighed quantity [99.6 g] of commercial Great Garden Fertilizer granule* (Scott 5-10-5) was mixed with weighed quantity of the coating media [2 g of the composition of Example 1] in a stoppered wide-mouth, one ounce bottle.

* 5-10-5 fertilizer granule was reported to contain 5% N (1% ammoniacal nitrogen, 4% urea nitrogen), 10% P (P2O5) and 5% K, soluble potash (K2O).

The wet granules were then spread on a glass tray and allowed to dry under the hood for at least 1 day or until it was dry.

Treatment with Water, Collection of Wash Liquid and Analysis for Spectroscopic Analysis of Nitrogen, Phosphorous and Potassium After drying the coated fertilizer, 40 g of the sample was added to a 3 inch diameter standard testing sieve of 30 mesh to a height of approximately one inch. A funnel placed under the sieve with a paper filter to filter out powders. The filter paper (Whatman No 40) was pre-wetted by spraying 6 ml of distilled water into the funnel. Excess water was discarded. At the other end of the funnel, a 20 ml vial was placed to collect the filtrate.

12 ml of water was sprayed for a duration of 20 seconds onto the fertilizer granules at the distance about 3 inches from the surface. The liquid was then allowed to seep down to the filter paper into the 20 ml vial where it was collected within an average time of 15 minutes. An empty second vial then, replaced the first one and another 12 ml of water was sprayed for 20 seconds at about 3 inches from the surface and the filtrate collected within 15 minutes. The process continued until an amount of water equivalent to 1-inch rain had been sprayed onto the fertilizer (10 vials collected per trial). The collected samples were then analyzed for the concentration of nitrogen, phosphorous and potassium by spectroscopic analysis, using an automated atomic absorption spectrophotometer.

EXAMPLE 3 [0.8% Lignin]

Example 2 was repeated except that 99.2 g of the fertilizer granule was treated with 4 g of composition of Example 1.

EXAMPLE 4 [1.2% Lignin]

Example 2 was repeated except that 98.8 g of the fertilizer granule was treated with 6 g of composition of Example 1.

EXAMPLE 5 [1.2% Lignin]

Example 2 was repeated except that 98.8 g of the fertilizer granule was treated with 4 g of composition similar to Example 1 containing 30% lignin instead of 17.7% lignin.

EXAMPLE 6 [Blank]

Example 2 was repeated except that 100 g of the fertilizer granule was treated with 2 g of water and dried.

EXAMPLE 7

Example 2 was repeated except that 99.6 g of the fertilizer granule was treated with 2 g of a talc suspension. The talc suspension contained 16% talc, 0.015 Agrimer AL 30 (Ganex V 220, C 20 alpha olefin grafted vinyl pyrrolidone grafted copolymer containing 20% pyrrolidone moiety), the suspension was prepared according to Example 1 for the talc replacing lignin; the balance being water.

EXAMPLE 8

Example 2 was repeated except that 98.4 g of the fertilizer granule was first treated with 4 g of a 20% solution of Agrimer VA 6 (copolymer of vinyl pyrrolidone and vinyl acetate). The granule was partially dried for a period of 8 hours in a laboratory hood followed by a second coating with 4 g of a 20% solution of Agrimer VEMA H 240 (methyl vinyl ether-maleic acid copolymer).

While the invention has been described with particular reference to certain embodiments thereof, it will be understood that changes and modifications may be made which are within the skill of the art. Accordingly, it is intended to be bound only by the following claims.

What is claimed is:

1. An aqueous dispersion for coating water-soluble granules of a water soluble active agricultural chemical to substantially increase the rain fastness of said active, comprising, by wt
   (a) at least 0.1% of a polymeric anionic dispersing agent which is an olefin-maleic acid/ester condensate partially neutralized, or copolymers thereof,
   (b) 5–30% of lignin or talc, and
   (c) to 100% of water.

2. The dispersion of claim 1 which is dried to a powder.

3. A granule of a water soluble active agricultural chemical which exhibits substantially increased rain fastness coated with the dispersion of claim 1 to provide 0.1–5 parts of (b) on 100 parts of the granule.

4. A granule according to claim 3 wherein said active is a commercial fertilizer.

5. A granule according to claim 4 wherein said active is urea.

6. A granule according to claim 3 wherein said active is a soil nutrient.

7. A granule according to claim 3 which has a 20% reduction in wash off of said active after a one inch rain fall as compared to an uncoated granule.

* * * * *